United States Patent
Chen et al.

(10) Patent No.: US 9,658,958 B2
(45) Date of Patent: May 23, 2017

(54) CONTROL APPARATUS AND CONTROL METHOD WITH MULTIPLE FLASH MEMORY CARD CHANNELS

(71) Applicant: NOREL SYSTEMS LIMITED, Tianjin (CN)

(72) Inventors: Miao Chen, Tianjin (CN); Yuanlong Wang, Tianjin (CN)

(73) Assignee: NOREL SYSTEMS LIMITED, Tianjin (CN)

( * ) Notice: Subject to any disclaimer, the term of this patent is extended or adjusted under 35 U.S.C. 154(b) by 29 days.

(21) Appl. No.: 14/647,094

(22) PCT Filed: Jul. 26, 2013

(86) PCT No.: PCT/CN2013/000890
§ 371 (c)(1),
(2) Date: May 25, 2015

(87) PCT Pub. No.: WO2014/086085
PCT Pub. Date: Jun. 12, 2014

(65) Prior Publication Data
US 2015/0309924 A1    Oct. 29, 2015

(30) Foreign Application Priority Data
Dec. 7, 2012    (CN) .......................... 2012 1 0526541

(51) Int. Cl.
*G06F 12/02*    (2006.01)
*G06F 13/38*    (2006.01)

(52) U.S. Cl.
CPC ........ *G06F 12/0246* (2013.01); *G06F 13/385* (2013.01); *G06F 2212/1016* (2013.01);
(Continued)

(58) Field of Classification Search
CPC ............... G06F 13/385; G06F 12/0246; G06F 2213/3804; G06F 2212/7208; G06F 2212/1016
See application file for complete search history.

(56) References Cited

U.S. PATENT DOCUMENTS

| | | | |
|---|---|---|---|
| 2009/0292865 A1* | 11/2009 | Hong | .................... G06F 3/0613 711/103 |
| 2010/0037001 A1* | 2/2010 | Langlois | ............. G06F 12/0246 711/103 |

(Continued)

FOREIGN PATENT DOCUMENTS

| CN | 101334710 A | 12/2008 |
|---|---|---|
| CN | 101398745 A | 4/2009 |

(Continued)

OTHER PUBLICATIONS

International Search Report, ISR, Jul. 11, 2013.

*Primary Examiner* — Hiep Nguyen
(74) *Attorney, Agent, or Firm* — Locke Lord LLP; Tim Tingkang Xia, Esq.

(57) ABSTRACT

A control apparatus with multiple flash memory card channels includes a host side port unit, an instruction data processing unit, and flash memory card port units. The host side port unit exchanges a host side instruction and host side read/write data with a high-speed serial communication protocol host side. The flash memory card port units respectively exchange flash memory card instructions and flash memory card read/write data with a plurality of flash memory cards. An instruction from the high-speed serial communication protocol host side is divided into multiple sub-instructions to be respectively transmitted to the flash memory card port units and exchange of instruction and data with a plurality of flash memory cards is carried out in a coincident period of time so as to achieve the purposes of (Continued)

expanding access capacity and increasing access speed, reducing the operation cost of products, and enhancing flexibility of use of flash memory cards.

46 Claims, 4 Drawing Sheets

(52) U.S. Cl.
CPC ............... *G06F 2212/7208* (2013.01); *G06F 2213/3804* (2013.01)

(56) References Cited

U.S. PATENT DOCUMENTS

| 2010/0125695 | A1* | 5/2010 | Wu | G06F 3/0613 711/103 |
| 2011/0213913 | A1* | 9/2011 | Yao | G06F 12/0246 711/103 |
| 2011/0239009 | A1* | 9/2011 | Noda | G06F 13/385 713/300 |
| 2012/0079170 | A1* | 3/2012 | Chang | G06F 12/0246 711/103 |
| 2012/0166911 | A1* | 6/2012 | Takahashi | G06F 11/1048 714/758 |
| 2012/0192032 | A1* | 7/2012 | Iwasaki | G06F 11/1048 714/758 |
| 2012/0216098 | A1* | 8/2012 | Moro | G06F 11/1048 714/785 |
| 2012/0239852 | A1* | 9/2012 | Calvert | G06F 11/1441 711/103 |
| 2012/0284587 | A1* | 11/2012 | Yu | G06F 3/0608 714/773 |

FOREIGN PATENT DOCUMENTS

| CN | 101593085 A | 12/2009 |
| CN | 103034603 A | 4/2013 |
| JP | 2006092521 A | 4/2006 |

* cited by examiner

CONTROL APPARATUS AND CONTROL METHOD WITH MULTIPLE FLASH MEMORY CARD CHANNELS

(a) TECHNICAL FIELD OF THE INVENTION

The present invention relates generally to a control apparatus and a control method with multiple flash memory card channels, and more particularly to such a control apparatus and control method with a host interface based on high-speed serial communication protocols.

(b) DESCRIPTION OF THE PRIOR ART

Recently, high-speed serial communication protocols have increasingly taken the place of the conventional parallel communication. For example, SATA (Serial ATA) has replaced PATA (Parallel MA) and PCI Express has replaced PCI. On the other hand, due to the advantages of large capacity, small volume, high speed, and convenience of use, flash memory cards have played an important in daily living and operations. The transmission speeds of all sorts of flash memory cards have been greatly increased. For example, security digital memory cards have reached the maximum transmission speed of 104 megabytes per second and the maximum transmission speed of compact flash memory cards has reached 167 megabytes. Under this condition, the traditional parallel transmission no long suits the need and thus, flash memory card access products with high-speed serial communication protocol based host interface have become a new trend. Although the high-speed serial communication protocol based flash memory card access products help increase the transmission speed, yet the bandwidth of the high-speed serial communication protocol has not been fully used. The bottleneck is the transmission rate of the flash memory cards. Flash memory card control apparatuses and control methods with multiple channels that are currently known treat the flash memory card connected to each channel as independent data storage device and operations of reading/writing data have been performed separately to each flash memory card at different times. This causes a great waste of the bandwidth. Thus, it would be favored by the market if a control apparatus and a control method with multiple flash memory card channels can fully take advantage of the host interface bandwidth offered by high-speed serial communication protocol.

SUMMARY OF THE INVENTION

The technical issue that the present invention aims to handle is to overcome the above-discussed drawbacks of the known art by providing a control apparatus and a control method with multiple flash memory card channels thereof wherein a host side instruction transmitted from a high-speed serial communication protocol host side is divided by an instruction data processing unit into multiple sub-instructions and data accesses to a plurality of flash memory cards are simultaneously performed by a plurality of flash memory card port units so as to expand access capacity and increase access speed.

The technical solution that the present invention adopts to handle the technical issue is as follows:

A control apparatus with multiple flash card channels according to the present invention comprises a host side port unit, an instruction data processing unit, and flash memory card port units. The host side port unit receives a host side instruction and host side write data from a high-speed serial communication protocol host side and transmits them to the instruction data processing unit and receives host side read data from the instruction data processing unit and transmits them to the high-speed serial communication protocol host side. The instruction data processing unit receives the host side instruction and the host side write data from the host side port unit and also receives flash memory card read data from a plurality of flash memory card port units, and transmits flash memory card instructions and flash memory card write data to the plurality of flash memory card port units and transmits the host side read data to the host side port unit. The plurality of flash card memory port units receive the flash memory card instructions and the flash memory card write data from the instruction data processing unit and also receives the flash memory card read data from a plurality of flash memory cards and transmits the flash memory card read data to the instruction data processing unit and transmits the flash memory card instructions and the flash memory card write data to the plurality of flash memory cards.

In the above apparatus, in a writing operation of the high-speed serial communication protocol host side, the multiple flash memory card instructions and the multiple flash memory card write data that are formed by being divided by the instruction data processing unit are transmitted through the plurality of flash memory card port units to the plurality of flash memory cards in processes that are coincident in time and in the reading operation of the high-speed serial communication protocol host side, the flash memory card read data of the plurality of flash memory cards are received by the instruction data processing unit via the plurality of flash memory card port units in processes that are coincident in time.

In the above apparatus, total length of the multiple flash memory card write data generated by being divided by the instruction data processing unit is equal to a length of the host side write data received by the instruction data processing unit and total length of the multiple flash memory card read data received by the instruction data processing unit is equal to a length of the host side read data that is formed by being combined by the instruction data processing unit.

In the above apparatus, according to the capacities and number of flash memory cards in connection with the plurality of flash memory card port units, the instruction data processing unit divides the host side instruction transmitted from the high-speed serial communication protocol host side to generate the multiple flash memory card instructions to be respectively transmitted to the plurality of flash memory card port units. In a writing operation of the high-speed serial communication protocol host side, the instruction data processing unit divides host side write data received thereby to generate multiple flash memory card write data to be respectively transmitted to the plurality of flash memory card port units, whereby the data are written by means of the plurality of flash memory card port units into the plurality of flash memory cards in processes that are coincident in time. In a reading operation of the high-speed serial communication protocol host side, the plurality of flash memory card port units reads data from the plurality of flash memory cards in processes that are coincident in time to form multiple flash memory card read data and transmits them to the instruction data processing unit, whereby the instruction data processing unit combines the multiple flash memory card read data to form host side read data to be transmitted to the host side port unit.

In a control method of a control apparatus with multiple flash memory card channels according to the present invention, in a writing operation of a high-speed serial communication protocol host side, a host side instruction and host side write data are received from the high-speed serial communication protocol host side, the host side instruction and the host side write data being respectively divided into multiple flash memory card instructions and multiple flash memory card write data, the multiple flash memory card instructions and multiple flash memory card write data so divided being transmitted to a plurality of flash memory cards, and in a reading operation of the high-speed serial communication protocol host side, a host side instruction is received from the high-speed serial communication protocol host side, the host side instruction being divided into multiple flash memory card instructions, the multiple flash memory card instructions so divided being transmitted to a plurality of flash memory cards, and flash memory card read data are received from the plurality of flash memory cards, the multiple flash memory card read data being first combined to form host side read data, the host side read data so combined being then transmitted to the high-speed serial communication protocol host side.

The efficacy of the control apparatus and the control method with multiple flash memory card channels thereof according to the present invention is that the control apparatus with multiple flash memory card channels allows a high-speed serial communication protocol host side to treat a plurality of small capacity flash memory cards as a single large capacity flash memory card and allows for simultaneously performing data accesses to a plurality of flash memory cards so as to increase the access capacity and the access speed thereby achieving full use of the transmission bandwidth of the high-speed serial communication protocol, reduction of operation cost of the users, and enhancement of operation flexibility.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
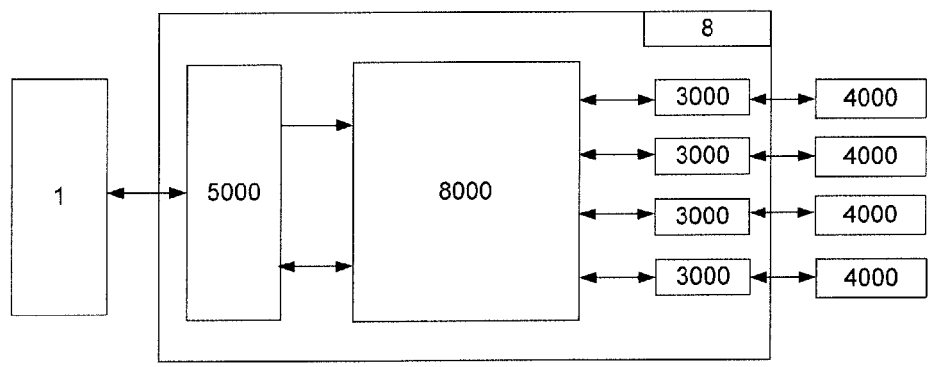
FIG. 1 is a block diagram of the entirety of a control apparatus with multiple flash memory card channels according to the present invention.

As shown in FIG. 1, a control apparatus 8 with multiple flash memory card channels comprises a host side port unit 5000, an instruction data processing unit 8000, and flash memory card port units 3000. The host side port unit 5000 exchanges a host side instruction and host side read/write data with a high-speed serial communication protocol host side 1. The flash memory card port units 3000 respectively exchange flash memory card instructions and flash memory card read/write data with a plurality of flash memory cards 4000.

In a writing operation of the high-speed serial communication protocol host side 1, multiple flash memory card instructions 1006 and multiple flash memory card write data 1008 that are generated through being divided by the instruction data processing unit 8000 are transmitted respectively through the plurality of flash memory card port units 3000 to the plurality of flash memory cards 4000. The instruction data processing unit 8000, after first confirming connection of the flash memory cards 4000 with the flash memory card port units 3000, starts writing data from the flash memory card port units 3000 to the flash memory cards 4000. The confirmation needs an extremely short, minute period of time, which can be simply neglected, and after each of the flash memory card port units 3000 has been activated, a transmission process is entered, wherein the flash memory card port units 3000 and the flash memory cards 4000 respectively correspond to each other in a one to one manner so that each of the flash memory card port units 3000 transmits data to the corresponding one of the flash memory cards 4000 and each of the flash memory cards 4000 receives data from the corresponding one of the flash memory card port units 3000, wherein the transmission process of the flash memory card port units 3000 are coincident with each other in time. Each of the flash memory cards 4000 may receive data that are of different lengths and the ones of the flash memory cards 4000 that receive data having short lengths would complete data reception earlier and thus stop further data reception, whereby the flash memory cards 4000 will complete the operations and stop data reception one by one until the last one of the flash memory cards 4000 stops reception and thus the entire transmission process ends. The entire transmission process during which the flash memory card port units 3000 respectively transmit data to the flash memory cards 4000 would last for a period of time that corresponds to the time period required for the one of the flash memory cards 4000 that receives the maximum amount of data to complete the reception of the data. Considering the known art requires a sustaining period of time for an entire transmission process to be the sum of the time periods of the flash memory card port units individually transmitting memory to the corresponding flash memory cards, the technical effect achieved with the present invention is quite apparent.

In a reading operation of the high-speed serial communication protocol host side 1, the instruction data processing unit 8000, after confirming the flash memory card port units 3000 are connected with the flash memory cards 4000, allows the flash memory card port units 3000 to start reading data from the flash memory cards 4000. The confirmation needs an extremely short, minute period of time, which can be simply neglected. The flash memory card port unit 3000 and the flash memory cards 4000 are still set to correspond to each other in a one to one manner. During the reception process after each of the flash memory card port unit 3000 has been activated, each of the flash memory card port units 3000 receives data from the corresponding one of the flash memory cards 4000 and each of the flash memory cards 4000 transmits data to the corresponding one of the flash memory card port units 3000. At the same time of receiving data from the flash memory cards 4000, each of the flash memory card port unit 3000 also transmits the data to the instruction data processing unit 8000. Each of the flash memory card port units 3000 may receive data that are of different lengths and the ones of the flash memory card port units 3000 that receive data having short lengths would complete data reception earlier and thus stop further data reception, whereby the flash memory card port units 3000 will complete the operations and stop data reception one by one until the last one of the flash memory card port units 3000 stops reception and thus the entire transmission process ends. Thus, the process during which the instruction data processing unit 8000 receives, via the plurality of flash memory card port units 3000, flash memory card read data 1010 from the plurality of flash memory cards 4000 is also coincident with each other in time. The entire reception process would lasts for a period of time that corresponds to the time period required for the one of the flash memory card port units 3000 that receives the maximum amount of data to complete the reception of the data. The technical effect is also quite apparent.

Figure 2:
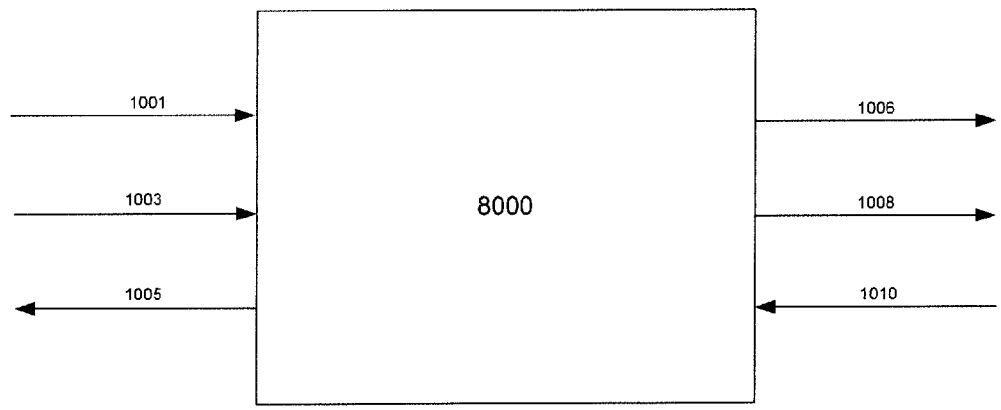
FIG. 2 is a diagram illustrating external signal connection of an instruction data processing unit of the control apparatus with multiple flash memory card channels according to the present invention.

As shown in FIG. 2, in the control apparatus 8 with multiple flash memory card channels, based on the capacities and number of the flash memory cards that are connected to the plurality of flash memory card port units 3000, the instruction data processing unit 8000 divides a host side instruction 1001 transmitted from the high-speed serial communication protocol host side 1 so as to generate multiple flash memory card instructions 1006 to be transmitted to the plurality of flash memory card port units 3000. During a writing operation of the high-speed serial communication protocol host side, the instruction data processing unit 8000 divides host side write data 1003 received thereby to generate multiple flash memory card write data 1008 to be transmitted to the plurality of flash memory card port units 3000. Transmission of the divided instructions can be made, at the time when one of the flash memory card port units 3000 is in operation, to another one of the flash memory card port units 3000, so that said another one of the flash memory card port units 3000 is caused to start operation, and so on, whereby all the flash memory card port units 3000 start to proceed with a writing operation. In a reading operation of the high-speed serial communication protocol host side, the instruction data processing unit 8000 divides a host side instruction 1001 into multiple flash memory card instructions 1006, which are transmitted through the plurality of flash memory card port units 3000 to the plurality of flash memory cards 4000, and the instruction data processing unit 8000 receives, via the plurality of flash memory card port units 3000, flash memory card read data 1010 from the plurality of flash memory cards 4000. Transmission of the divided instructions can be made, at the time when one of the flash memory card port units 3000 is in operation, to another one of the flash memory card port units 3000, so that said another one of the flash memory card port units 3000 is caused to start operation, whereby all the flash memory card port units 3000 start to proceed with a reading operation. After the instruction data processing unit 8000 receives multiple flash memory card read data 1010 from the plurality of flash memory card port units 3000, the instruction data processing unit 8000 combines the multiple flash memory card read data 1010 together to form host side read data 1005 to be transmitted to the host side port unit 5000. This process realizes successful division of a host side instruction 1001 into multiple flash memory card instructions.

Figure 3:
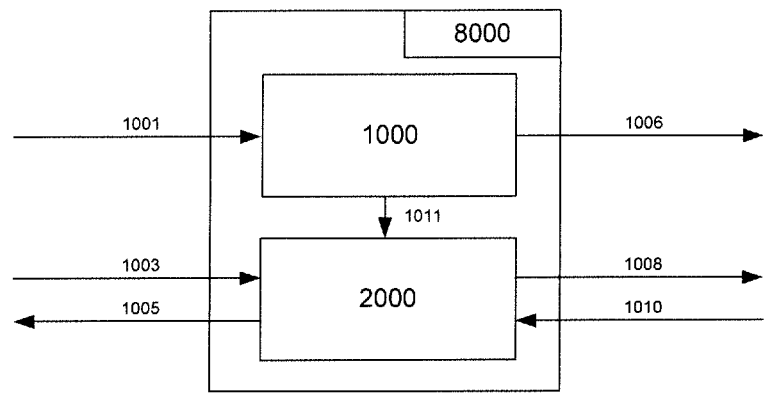
FIG. 3 is a diagram illustrating internal structure and signal connection of the instruction data processing unit of the control apparatus with multiple flash memory card channels according to the present invention.

As shown in FIG. 3, as further improvements of the control apparatus with multiple flash memory card channels of the present invention and the control method thereof, in the control apparatus 8 with multiple flash memory card channels, the instruction data processing unit 8000 comprises an instruction processing unit 1000 and a data processing unit 2000. The instruction processing unit 1000, based on the capacities and number of the flash memory cards that are connected to the plurality of flash memory card port units 3000, divides a host side instruction 1001 transmitted from the high-speed serial communication protocol host side 1 so as to generate multiple flash memory card instructions 1006 to be transmitted to the plurality of flash memory card port units 3000 and also generate a data storage control message 1011 to be transmitted to the data processing unit 2000. In a reading operation of the high-speed serial communication protocol host side, the data processing unit 2000, based on the data storage control message 1011 transmitted from the instruction processing unit 1000, divides host side write data 1003 into multiple flash memory card write data 1008 to be transmitted to the plurality of flash memory card port units 3000. In the reading operation of the high-speed serial communication protocol host side, the plurality of flash memory card port units 3000 transmits multiple flash memory card read data 1010 to the data processing unit 2000 and the data processing unit 2000, based on a data storage control message 1011 transmitted from the instruction processing unit 1000, combines the multiple flash memory card read data 1010 into host side read data 1005 to be transmitted to the host side port unit 5000.

The total length of the multiple flash memory card write data 1008 generated by being divided by the instruction data processing unit 8000 is equal to the length of the host side write data 1003 received by the instruction data processing unit 8000. The total length of the multiple flash memory card read data 1010 received by the instruction data processing unit 8000 is equal to the length of the host side read data 1005 formed by being combined by the instruction data processing unit 8000.

Figure 4:
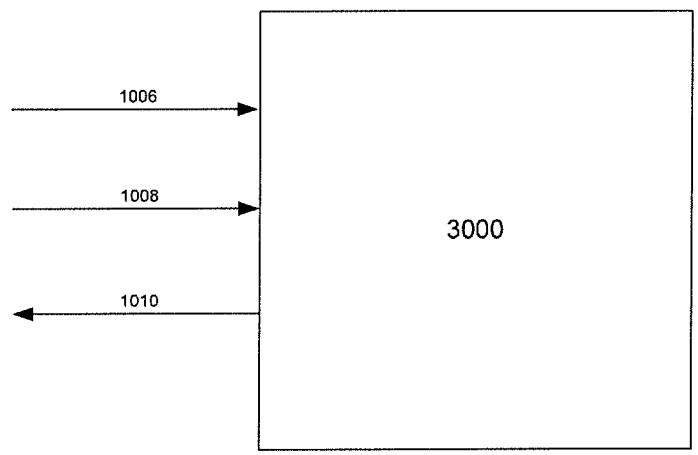
FIG. 4 is a diagram illustrating external signal connection of a flash memory card port unit of the control apparatus with multiple flash memory card channels according to the present invention.

As shown in FIG. 4, in the control apparatus with multiple flash memory card channels, a plurality of flash memory card port units 3000 respectively receive multiple flash memory card instructions 1006 from the instruction data processing unit 8000 and transmit them to the plurality of flash memory cards 4000. In a writing operation of the high-speed serial communication protocol host side, the plurality of flash memory card port units 3000 receives multiple flash memory card write data 1008 from the instruction data processing unit 8000 and transmits, during a coincident time period, the multiple flash memory card write data 1008 to the plurality of flash memory cards 4000; and in a reading operation of the high-speed serial communication protocol host side, the plurality of flash memory card port units 3000, during a coincident time period, reads data from the plurality of flash memory cards 4000 and transmits the multiple flash memory card read data 1010 to the instruction data processing unit 8000.

Figure 5:
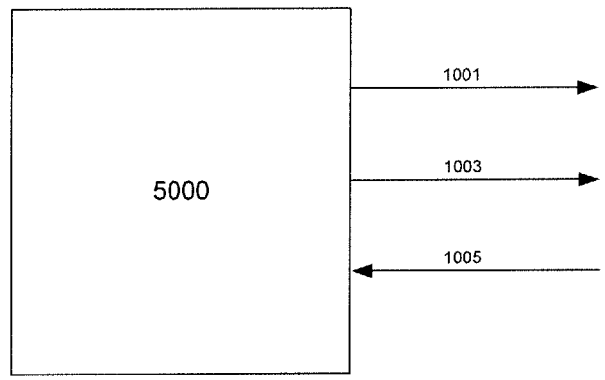
FIG. 5 is a diagram illustrating external signal connection of a host side port unit of the control apparatus with multiple flash memory card channels according to the present invention.

As shown in FIG. 5, in the control apparatus 8 with multiple flash memory card channels, the host side port unit 5000 transmits a host side instruction 1001 from the high-speed serial communication protocol host side 1 to the instruction data processing unit 8000. In a writing operation of the high-speed serial communication protocol host side, the host side port unit 5000 transmits host side write data 1003 from the high-speed serial communication protocol host side 1 to the instruction data processing unit 8000; and in a reading operation of the high-speed serial communication protocol host side, the host side port unit 5000 receives host side read data 1005 from the instruction data processing unit 8000 and transmit them to the high-speed serial communication protocol host side 1.

Figure 6:
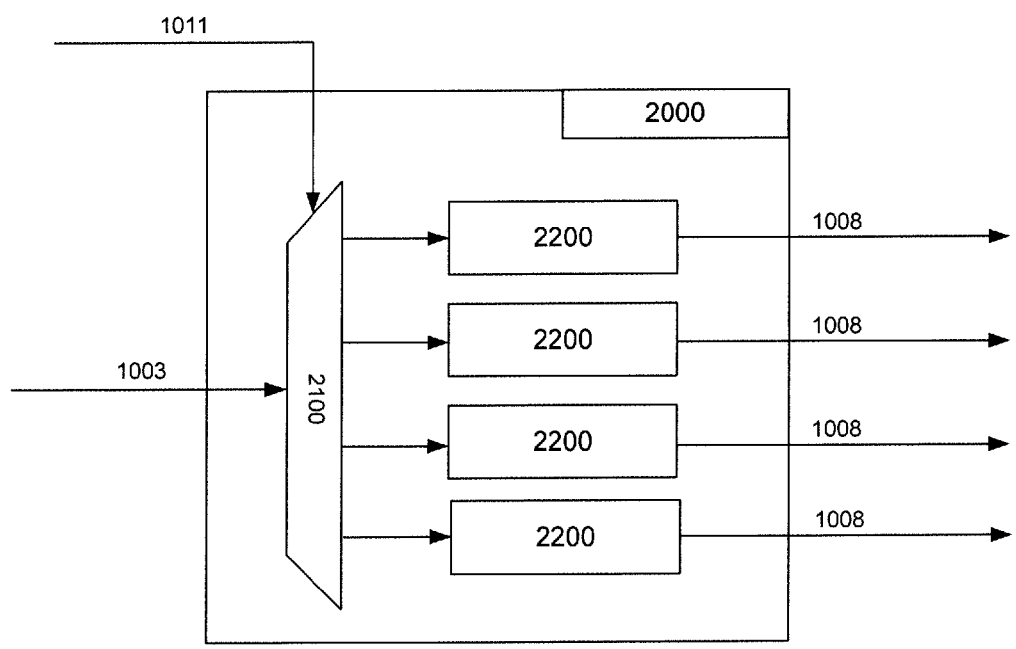
FIG. 6 is an internal functional block diagram of the data processing unit illustrating a writing operation of a high-speed serial communication protocol host side of the control apparatus with multiple flash memory card channels according to the present invention.

As shown in FIG. 6, in the control apparatus 8 with multiple flash memory card channels, in a writing operation of the high-speed serial communication protocol host side, based on a data storage control message 1011 from the instruction processing unit 1000, the data processing unit 2000 divides, by means of a data selector 2100 arranged therein, host side write data 1003 divided into multiple sets of data to be respectively written into designated data buffer areas 2200. The plurality of flash memory card port units 3000 accesses the multiple sets of flash memory card write data 1008 from the plurality of data buffer areas 2200 and writes the multiple flash memory card write data 1008 during a coincident period of time, respectively into the plurality of flash memory cards 4000.

Figure 7:
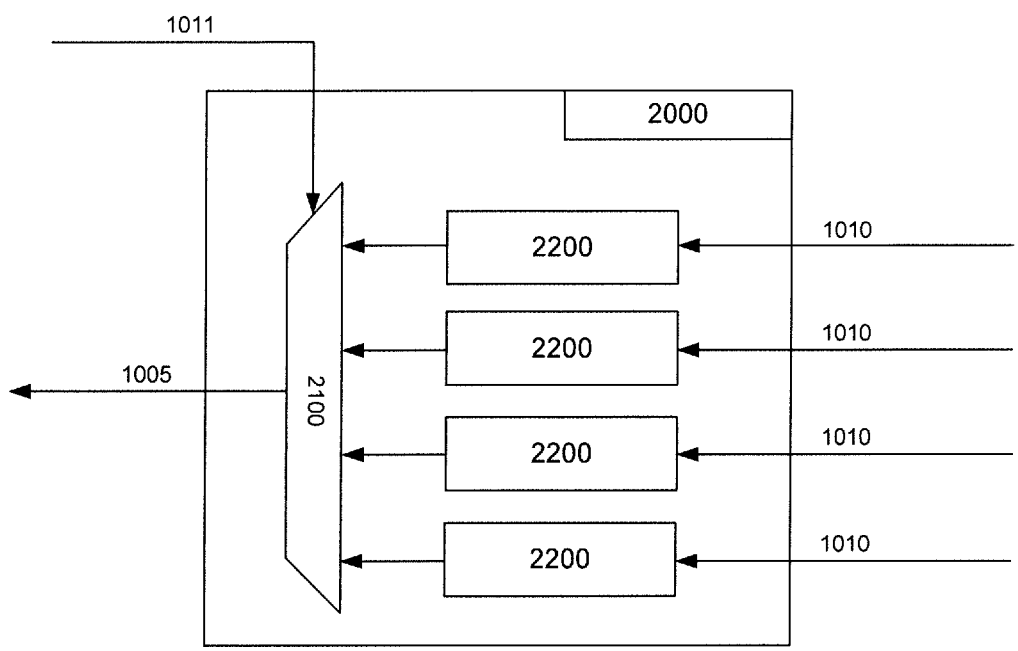
FIG. 7 is an internal functional block diagram of the data processing unit illustrating a reading operation of the high-speed serial communication protocol host side of the control apparatus with multiple flash memory card channels according to the present invention.

As shown in FIG. 7, in the control apparatus 8 with multiple flash memory card channels, in a reading operation of the high-speed serial communication protocol host side 1, the plurality of flash memory card port units 3000 reads, during a coincident period of time, data from the plurality of flash memory cards 4000 to form multiple flash memory card read data 1010 to be transmitted to a plurality of data buffer areas 2200 arranged in the data processing unit 2000 so that the data processing unit 2000, based on a data storage control message 1011 transmitted from the instruction processing unit 1000, uses a data selector 2100 arranged therein to access multiple flash memory card read data 1010 from designated ones of the data buffer area 2200 and combine them to form host side read data 1005. The data processing unit 2000 then transmits the host side read data 1005 to the host side port unit 5000 to be further transmitted to the high-speed serial communication protocol host side 1.

In the control apparatus 8 with multiple flash memory card channels, the host side port unit 5000 can be a USB (Universal Serial Bus) 3.0 protocol host side port unit, a SATA protocol host side port unit, or a PCI Express protocol host side port unit, or may alternatively be a Thunderbolt or Light Peak protocol host side port unit.

In the control apparatus with multiple flash memory card channels, the plurality of flash memory card port units 3000 can be one or more types of secure digital card (SD card) port units, micro secure digital card (micro SD card or IF card) port units, compact flash card (CF card) port units, multimedia card (MMC card) port units, embedded multimedia card, (eMMC card) port units and memory stick (MS card) port units. The instruction data processing unit 8000 controls, via a port controller, the performance of the flash memory card port unit 3000. The port controller can be removably mounted to the flash memory card port unit 3000 and changing the port controller allows the flash memory card port unit 3000 to change from one type of the above described port units into another one. This helps improve compatibility of the flash memory card port unit 3000 and greatly lowers down the manufacture cost.

The technical issue that the present invention overcomes is that to overcome the drawbacks of the known techniques, a control apparatus and a control method with multiple flash memory card channels thereof are provided so that a host side instruction transmitted from a high-speed serial communication protocol host side is divided and thus decomposed into a plurality of flash memory card instructions and a plurality of flash memory card port units is used to simultaneously perform data access to a plurality of flash memory cards, whereby an effect of expanding access capacity and increasing access speed can be achieved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the fauns and details of the device illustrated and in its operation can be made by those skilled in the art without departing in any way from the claims of the present invention.

We claim:

1. A control apparatus with multiple flash memory card channels for a plurality of flash memory cards (4000), the control apparatus comprising:
 a host side port unit (5000);
 an instruction data processing unit (8000), comprising an instruction processing unit (1000) and a data processing unit (2000), wherein the instruction processing unit (1000) generates a data storage control message (1011) to be transmitted to the data processing unit (2000) according to number and capacities of the flash memory cards (4000) in connection with the control apparatus, and the data processing unit (2000) comprises a data selector (2100); and
 a plurality of flash memory card port units (3000) independent of each other,
 wherein in a writing operation of the high-speed serial communication protocol host side (1), the instruction data processing unit (8000) receives, via the host side port unit (5000), a host side instruction (1001) and host side write data (1003) from the high-speed serial communication protocol host side (1) and the instruction data processing unit (8000) divides the host side instruction (1001) and the host side write data (1003) into multiple flash memory card instructions (1006) and multiple flash memory card write data (1008) respectively, which are transmitted through the plurality of flash memory card port units (3000) to the plurality of flash memory cards (4000); and the data selector (2100) of the data processing unit (2000), based on the data storage control message (1011), divides and respectively writes the host side write data (1003) to designated ones of data buffer areas (2200); and wherein in a reading operation of the high-speed serial communication protocol host side (1), the instruction data processing unit (8000) receives, via the host side port unit (5000), a host side instruction (1001) from the high-speed serial communication protocol host side (1) and the instruction data processing unit (8000) divides the host side instruction (1001) into multiple flash memory card instructions (1006), which are transmitted through the plurality of flash memory card port units (3000) to the plurality of flash memory cards (4000), and the instruction data processing unit (8000) receives, via the plurality of flash memory card port units (3000), flash memory card read data (1010) from the plurality of flash memory cards (4000), which are combined by the instruction data processing unit (8000) to form host side read data (1005), which are transmitted through the host side port unit (5000) to the high-speed serial communication protocol host side (1), and the data selector (2100) of the data processing unit (2000), based on the data storage control message (1011), reads and combines the host side read data (1005) from designated ones of the data buffer areas (2200).

2. The control apparatus according to claim 1, characterized in that in the writing operation of the high-speed serial communication protocol host side (1), the multiple flash memory card instructions (1006) and the multiple flash memory card write data (1008) that are formed by being divided by the instruction data processing unit (8000) are transmitted through the plurality of flash memory card port units (3000) to the plurality of flash memory cards (4000) in processes that are coincident in time and in the reading operation of the high-speed serial communication protocol host side (1), the flash memory card read data (1010) of the plurality of flash memory cards (4000) are received by the instruction data processing unit (8000) via the plurality of flash memory card port units (3000) in processes that are coincident in time.

3. The control apparatus according to claim 1, characterized in that total length of the multiple flash memory card write data (1008) generated by being divided by the instruction data processing unit (8000) is equal to a length of the host side write data (1003) received by the instruction data processing unit (8000) and total length of the multiple flash memory card read data (1010) received by the instruction data processing unit (8000) is equal to a length of the host side read data (1005) that is formed by being combined by the instruction data processing unit (8000).

4. The control apparatus according to claim 1, characterized in that the host side port unit (5000) is a universal serial bus 3.0 protocol host side port unit.

5. The control apparatus according to claim 1, characterized in that the host side port unit (5000) is a SATA protocol host side port unit.

6. The control apparatus according to claim 1, characterized in that the host side port unit (5000) is a PCI Express protocol host side port unit.

7. The control apparatus according to claim 1, characterized in that the host side port unit (5000) is a Thunderbolt protocol host side port unit.

8. The control apparatus according to claim 1, characterized in that one of the plurality of flash memory card port units (3000) is a secure digital card port unit.

9. The control apparatus according to claim 1, characterized in that one of the plurality of flash memory card port units (3000) is a micro secure digital card port unit.

10. The control apparatus according to claim 1, characterized in that one of the plurality of flash memory card port units (3000) is a compact flash card port unit.

11. The control apparatus according to claim 1, characterized in that one of the plurality of flash memory card port units (3000) is a multimedia card port unit.

12. The control apparatus according to claim 1, characterized in that one of the plurality of flash memory card port units (3000) is an embedded multimedia card port unit.

13. The control apparatus according to claim 1, characterized in that one of the plurality of flash memory card port units (3000) is a memory stick card port unit.

14. The control apparatus according to claim 2, characterized in that the host side port unit (5000) is a universal serial bus 3.0 protocol host side port unit.

15. The control apparatus according to claim 2, characterized in that the host side port unit (5000) is a SATA protocol host side port unit.

16. The control apparatus according to claim 2, characterized in that the host side port unit (5000) is a PCI Express protocol host side port unit.

17. The control apparatus according to claim 2, characterized in that the host side port unit (5000) is a Thunderbolt protocol host side port unit.

18. The control apparatus according to claim 2, characterized in that one of the plurality of flash memory card port units (3000) is a secure digital card port unit.

19. The control apparatus according to claim 2, characterized in that one of the plurality of flash memory card port units (3000) is a micro secure digital card port unit.

20. The control apparatus according to claim 2, characterized in that one of the plurality of flash memory card port units (3000) is a compact flash card port unit.

21. The control apparatus according to claim 2, characterized in that one of the plurality of flash memory card port units (3000) is a multimedia card port unit.

22. The control apparatus according to claim 2, characterized in that one of the plurality of flash memory card port units (3000) is an embedded multimedia card port unit.

23. The control apparatus according to claim 2, characterized in that one of the plurality of flash memory card port units (3000) is a memory stick card port unit.

24. The control apparatus according to claim 3, characterized in that the host side port unit (5000) is a universal serial bus 3.0 protocol host side port unit.

25. The control apparatus according to claim 3, characterized in that the host side port unit (5000) is a SATA protocol host side port unit.

26. The control apparatus according to claim 3, characterized in that the host side port unit (5000) is a PCI Express protocol host side port unit.

27. The control apparatus according to claim 3, characterized in that the host side port unit (5000) is a Thunderbolt protocol host side port unit.

28. The control apparatus according to claim 3, characterized in that one of the plurality of flash memory card port units (3000) is a secure digital card port unit.

29. The control apparatus according to claim 3, characterized in that one of the plurality of flash memory card port units (3000) is a micro secure digital card port unit.

30. The control apparatus according to claim 3, characterized in that one of the plurality of flash memory card port units (3000) is a compact flash card port unit.

31. The control apparatus according to claim 3, characterized in that one of the plurality of flash memory card port units (3000) is a multimedia card port unit.

32. The control apparatus according to claim 3, characterized in that one of the plurality of flash memory card port units (3000) is an embedded multimedia card port unit.

33. The control apparatus according to claim 3, characterized in that one of the plurality of flash memory card port units (3000) is a memory stick card port unit.

34. The control apparatus according to claim 1, characterized in that the host side port unit (5000) is a universal serial bus 3.0 protocol host side port unit.

35. The control apparatus according to claim 1, characterized in that the host side port unit (5000) is a SATA protocol host side port unit.

36. The control apparatus according to claim 1, characterized in that the host side port unit (5000) is a PCI Express protocol host side port unit.

37. The control apparatus according to claim 1, characterized in that the host side port unit (5000) is a Thunderbolt protocol host side port unit.

38. The control apparatus according to claim 1, characterized in that one of the plurality of flash memory card port units (3000) is a secure digital card port unit.

39. The control apparatus according to claim 1, characterized in that one of the plurality of flash memory card port units (3000) is a micro secure digital card port unit.

40. The control apparatus according to claim 1, characterized in that one of the plurality of flash memory card port units (3000) is a compact flash card port unit.

41. The control apparatus according to claim 1, characterized in that one of the plurality of flash memory card port units (3000) is a multimedia card port unit.

42. The control apparatus according to claim 1, characterized in that one of the plurality of flash memory card port units (3000) is an embedded multimedia card port unit.

43. The control apparatus according to claim 1, characterized in that one of the plurality of flash memory card port units (3000) is a memory stick card port unit.

44. A control method of a control apparatus with multiple flash memory card channels for a plurality of flash memory cards (4000), wherein the control apparatus comprises:
a host side port unit (5000);
an instruction data processing unit (8000), comprising an instruction processing unit (1000) and a data processing unit (2000), wherein the instruction processing unit (1000) generates a data storage control message (1011) to be transmitted to the data processing unit (2000) according to number and capacities of the flash memory cards (4000) in connection with the control apparatus, and the data processing unit (2000) comprises a data selector (2100); and
a plurality of flash memory card port units (3000) independent of each other;
wherein the control method comprises steps of:
in a writing operation of a high-speed serial communication protocol host side (1),
receiving, by the instruction data processing unit (8000) via the host side port unit (5000), a host side instruction (1001) and host side write data (1003) from the high-speed serial communication protocol host side (1),
respectively dividing, by the instruction data processing unit (8000), the host side instruction (1001) and the host side write data (1003) into multiple flash memory card instructions (1006) and multiple flash memory card write data (1008),
transmitting, through the plurality of flash memory card port units (3000), the multiple flash memory card instructions (1006) and multiple flash memory card write data (1008) so divided to the plurality of flash memory cards (4000), and
dividing and respectively writing, by the data selector (2100) of the data processing unit (2000) based on the data storage control message (1011), the host side write data (1003) to designated ones of data buffer areas (2200); and
in a reading operation of the high-speed serial communication protocol host side (1),
receiving, by the instruction data processing unit (8000) via the host side port unit (5000), a host side instruction (1001) from the high-speed serial communication protocol host side (1),
dividing, by the instruction data processing unit (8000), the host side instruction (1001) into multiple flash memory card instructions (1006),
transmitting, through the plurality of flash memory card port units (3000), the multiple flash memory card instructions (1006) so divided to the plurality of flash memory cards (4000), and then
receiving, by the instruction data processing unit (8000) via the plurality of flash memory card port units (3000), flash memory card read data (1010) from the plurality of flash memory cards (4000),
combining, by the instruction data processing unit (8000), the multiple flash memory card read data (1010) to form host side read data (1005),
transmitting, through the host side port unit (5000), the host side read data (1005) so combined to the high-speed serial communication protocol host side (1), and
reading and combining, by the data selector (2100) of the data processing unit (2000) based on the data storage control message (1011), the host side read data (1005) from designated ones of the data buffer areas (2200).

45. The control method according to claim 44, characterized in that in the writing operation of the high-speed serial communication protocol host side (1), the multiple flash memory card instructions (1006) and the multiple flash memory card write data (1008) that formed by dividing the host side instruction (1001) and the host side write data (1003) are transmitted to the plurality of flash memory cards (4000) in processes that are coincident in time and in the reading operation of the high-speed serial communication protocol host side (1), the flash memory card read data (1010) are received from the plurality of flash memory cards (4000) in processes that are coincident in time.

46. The control method according to claim 44, characterized in that total length of the multiple flash memory card write data (1008) formed by dividing the host side write data (1003) is equal to a length of the host side write data (1003) received and total length of the multiple flash memory card read data (1010) received from the plurality of flash memory cards (4000) is equal to a length of the combined host side read data (1005).

\* \* \* \* \*